United States Patent [19]

Zimmerman

[11] 4,173,277
[45] Nov. 6, 1979

[54] UNSCRAMBLING APPARATUS FOR BAR MATERIAL, INCLUDING LUMBER

[76] Inventor: Edwin H. Zimmerman, R.D. #1, New Holland, Pa. 17557

[21] Appl. No.: 884,496

[22] Filed: Mar. 8, 1978

[51] Int. Cl.² .......................................... B65G 47/12
[52] U.S. Cl. ................................... 198/443; 198/395; 198/474; 198/774; 414/745
[58] Field of Search ............... 198/443, 474, 774, 395, 198/444, 465, 466, 469, 470, 857; 214/1 P, 1 PB; 414/745, 748

[56] References Cited

U.S. PATENT DOCUMENTS

| | | | |
|---|---|---|---|
| 1,139,027 | 5/1915 | George | 198/774 |
| 1,180,737 | 4/1916 | Rees | 198/774 |
| 2,995,235 | 8/1961 | Maier | 198/774 |
| 3,157,292 | 11/1964 | Pachell | 214/1 P |
| 3,416,646 | 12/1968 | Boos et al. | 198/774 |
| 3,605,981 | 9/1971 | Danieli | 198/774 |
| 3,774,753 | 11/1973 | Jones | 198/395 |
| 4,023,667 | 5/1977 | Appel | 198/474 |
| 4,102,449 | 7/1978 | Shufran | 198/774 |

FOREIGN PATENT DOCUMENTS 1026686  3/1958 Fed. Rep. of Germany ........... 198/774

*Primary Examiner*—Joseph E. Valenza
*Attorney, Agent, or Firm*—C. Hercus Just

[57] ABSTRACT

An unscrambling apparatus for bars of material, including lumber which is unloaded in a bulk pile onto said unscrambler to be arranged for individual delivery from the discharge end of the apparatus comprising an elongated stationary frame having rails to receive said bulk at one end, an advancing frame operable sequentially to raise and advance said bars and including means to gradually arrange the bars in a limited row from the outer end of which control means are actuated for the outermost bar to be moved by flipping means to remove said outermost bar from the machine for transfer to further machines or operations.

4 Claims, 7 Drawing Figures

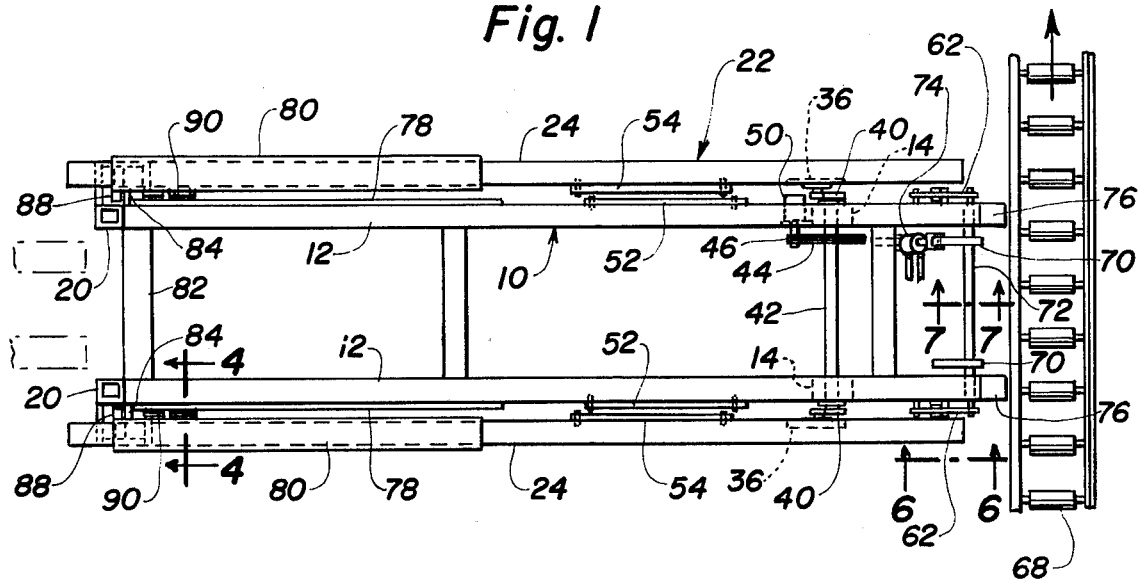
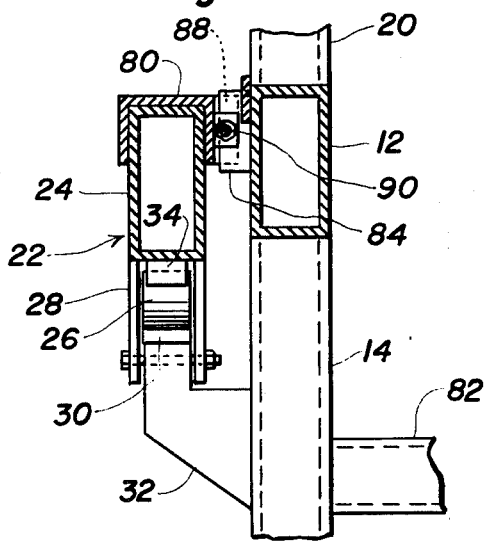
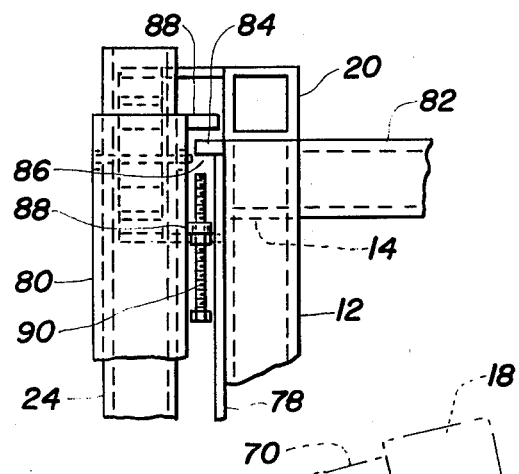
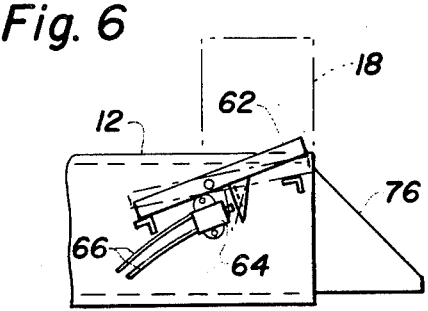
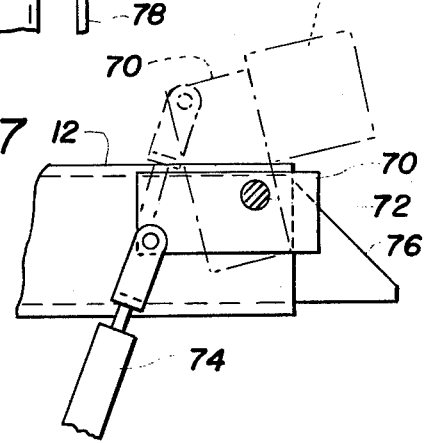

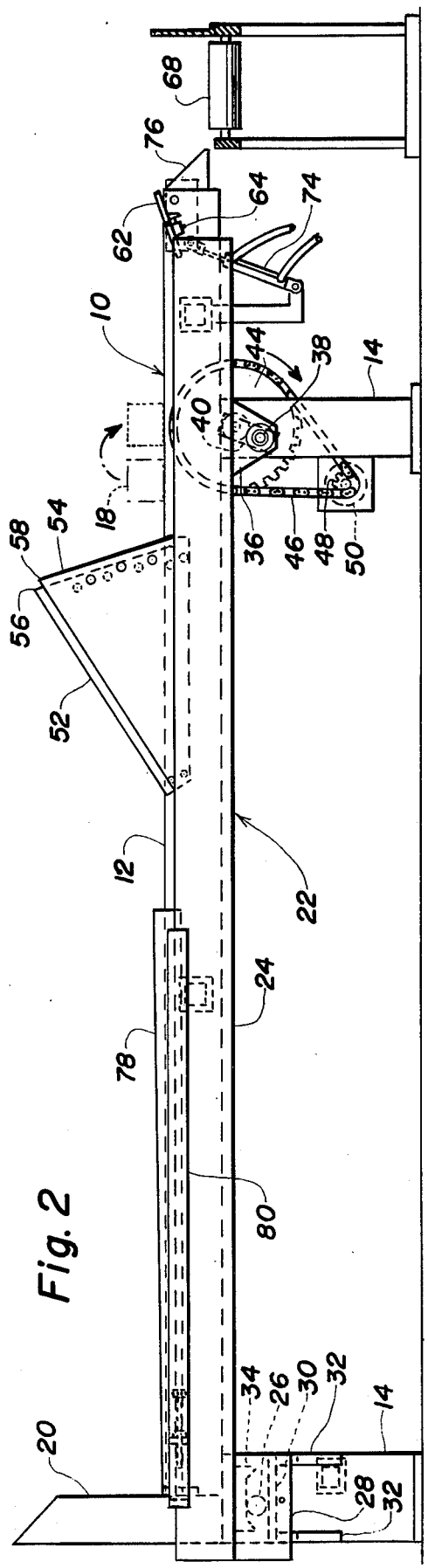
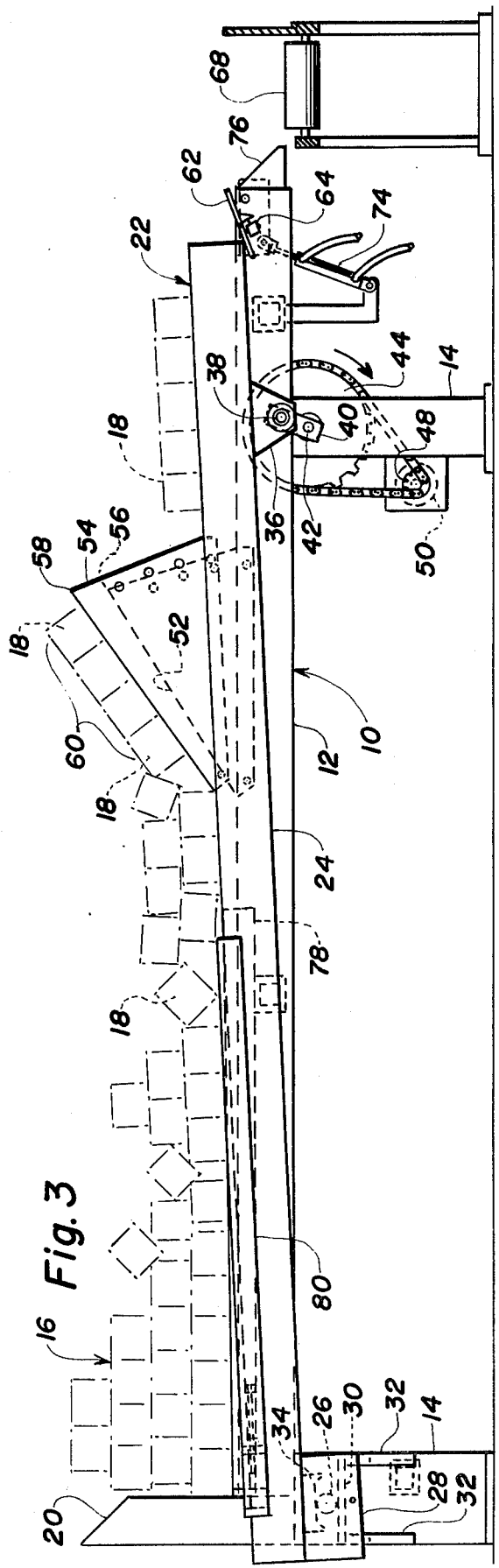
Fig.2
Fig.3

UNSCRAMBLING APPARATUS FOR BAR MATERIAL, INCLUDING LUMBER

BACKGROUND OF THE INVENTION

In many types of industry, it is quite common to deliver in bulk form bar-like objects, regardless of whether it is of a metallic, wooden, or other type material and discharge the same from a delivery truck, for example, onto apparatus which progressively arranges the bulk of bar-like material so as to deliver the same in a limited manner, such as one at a time, for transfer to operations which are to be performed upon the material. This is particularly found in the lumber industry, where logs or partially prepared larger timber or beams of lumber are delivered to sawing machines in which the same are transferred into finished lumber items of a substantially smaller nature than the original raw material. In order to minimize handling costs, machines have been developed heretofore by which bar-like objects, including timbers, have gradually been transformed from a bulk pile to a much smaller arrangement, especially one in which individual pieces are ultimately discharged from the delivery end of the machine for transfer to other machines, for example.

One of the very common ways of accomplishing such unscrambling comprises elongated members having toothed configurations on the upper edges thereof, one set of such members being relatively stationary, and the other set moving in a somewhat gyratory manner to sequentially lift the bars from the stationary member, then advance them toward the discharge end, and then bring them to rest upon the stationary member, followed by repeated steps of this type. In the prior art, toothed arrangements of various sizes have been resorted to and typical examples of these devices are represented by prior U.S. Pat. Nos. 1,139,027 to George, dated May 11, 1915; 1,180,737 to Rees, dated Apr. 25, 1916; 2,995,235 to Maier, dated Aug. 8, 1961; and 4,023,667 to Appel, dated May 17, 1977. Still another prior bar-handling apparatus, operating on a somewhat similar principle but not having a toothed arrangement on the advancing member is shown in U.S. Pat. No. 3,605,981 to Danieli, dated Sept. 20, 1971.

In said prior devices, there appears to be no ready means for adjusting the rate of feed, except possibly by varying the speed of a power means, such as a motor, but it has been found to be desirable in certain industries to provide for such adjustability in delivery speed and it is one of the principal purposes of the present invention to provide such adjustability by means of mechanism not found in said prior art.

SUMMARY OF THE INVENTION

It is one of the principal objects of the present invention to use relatively simple, elongated frame means, including a stationary frame and a cooperating advancing frame which do not employ toothed configurations on the frame members, as in the prior art and, by utilizing such relatively smooth elongated frame members, it is possible to include supporting and feed members thereon which may be adjusted to control the removal of bar-like members, including timbers from the initial bulk pile loaded onto the receiving end of the apparatus and, at a desired speed, cause the bulk which has been delivered to the machine to gradually be spread out so that by the time the individual pieces are ready to be discharged, they are disposed in a compact row, one piece high, for individual delivery from the discharge end of the machine.

It is a further object of the invention to include an individual elevating and dropoff member on each of the stationary and movable advancing frames to comprise an effective feed-out movement of the bars for purposes of finally arranging them in said aforementioned single row.

It is a further object of the invention to provide positive discharge means which sequentially engage the outermost individual bar object and control means are associated therewith for stopping the machine, the control means being triggered by the arrival of the outermost object at the discharge end of the stationary frame, to which it has been advanced by the oncoming row of objects, and when the control means has stopped the machine, a flipping unit raises and tilts the outermost object in a manner to cause it to fall by gravity from the delivery end of the apparatus, said flipping means preferably being operated by fluid actuated means, controlled manually by an operator who can visually determine the need for one of the object being delivered to further operating apparatus, such as saws or planers and the like.

Still another object of the invention is to provide such adjustable feed-regulating means in the form of relatively simple elongated plate-like members which are mounted upon and cooperate with the advancing frame from the receiving end thereof toward the aforementioned elevating means, the plate-like member being capable of advancing movement less than that of said advancing frame when the movement of the objects from the primary bulk thereof is desired to be less than the rate at which they would be moved by the advancing frame per se if it were not for the provision of said plate-like members thereon and the adjustable movement associated with said plate-like members.

Details of the foregoing objects and of the invention, as well as other objects thereof, are set forth in the following specification and illustrated in the accompanying drawings comprising a part thereof.

DESCRIPTION OF THE DRAWINGS

FIG. 1 is a top plan view of the preferred embodiment of the present invention and illustrating at the discharge end thereof an exemplary conveyor to receive individual objects from the unscrambling mechanism of the invention for transfer thereof to other operations.

FIG. 2 is a side elevation of the unscrambling apparatus shown in FIG. 1, but illustrated on a larger scale therein to facilitate the showing of details thereof, the advancing frame of said apparatus being shown in this figure in the lowermost position thereof.

FIG. 3 is a view similar to FIG. 2, but showing the advancing frame in an elevated and advanced position with respect to the stationary supporting frame of the apparatus and illustrating in phantom an exemplary arrangement of bar material, such as large timbers of wood disposed in a typical arrangement on the receiving and advancing frames of the apparatus during the operation thereof.

FIG. 4 is a fragmentary vertical elevation of one side of the frame means in the apparatus and showing support details of the receiving end of the support and advancing frames adjacent one side of the apparatus, as seen on the line 4—4 of FIG. 1.

FIG. 5 is a fragmentary top plan view of the details of the apparatus shown in FIG. 4, and comprising one corner of the machine adjacent the receiving end thereof.

FIG. 6 is a fragmentary side elevation of control mechanism for the discharge unit of the machine which is adjacent the delivery end thereof, as seen substantially from the line 6—6 of FIG. 1.

FIG. 7 is a fragmentary side elevation illustrating in full lines the idle position of the positive discharge mechanism of the apparatus and, in phantom, showing the discharge position thereof in which an exemplary bar object has been elevated and tilted and is in process of being discharged by gravity from the delivery end of said apparatus.

DETAILED DESCRIPTION

Referring to FIGS. 1-3, it will be seen that the apparatus comprising the present invention comprises a stationary frame 10, constituting a pair of parallel side bars 12 transversely spaced from each other, the bars 12 preferably comprising heavy-duty metal beams or tubular members. They extend for the full length of the machine as clearly shown in said figures and the opposite ends thereof are supported by suitable strong legs 14, of suitable material, at the corners of said frame. As viewed in said figures, the left-hand end is the receiving end of the frame which is adapted to receive a bulk load of objects which are to be unscrambled by the apparatus, said load, for example, being discharged onto the apparatus by a fork-lift truck or otherwise. A helter-skelter disposition of the objects usually results from such operation of a fork-lift truck, even though the ends of the objects may more or less be in relative alignment within a single plane, for example.

To facilitate receiving the bulk load 16 of objects 18, such as shown in exemplary manner in phantom at the left-hand of FIG. 3, stack-retaining members 20 extend upwardly from the base frame 10 respectively in transversely spaced arrangement, as clearly shown in FIGS. 1-3. It is to be understood that the objects 18 may be of any suitable nature, regardless of whether they are metallic, wood, or otherwise. In particular, the machine is adapted to handle large dimensions of wood, such as timbers or planks, which are to be sawed and/or further processed into boards, for example, of various kinds but the use of the machine is not to be restricted to such employment in accordance with the principles of the invention.

Associated with the base frame 10 is an advancing frame 22 comprising a pair of similar side bars or rails 24 which, if desired, may be similar in nature to the side bars 12 of stationary frame 10. Both of said frames are preferably intended for heavy-duty use. As seen from FIG. 1, the side bars 24 of advancing frame 22 are parallel to and adjacent the outer sides of the side bars 12 of base frame 10. The ends of the side bars 24, adjacent the loading end of the advancing frame, are supported upon rollers 26 for limited longitudinal movement, said rollers being mounted within a small housing 28 for rolling action upon horizontal plates 30, supported by brackets 32, as best shown in FIG. 4. A bearing block 34 is secured to the lower surfaces of the bars 24 for direct engagement with the rollers 26, as can be visualized best from FIGS. 2 and 3.

Adjacent the discharge end of the stationary and advancing frame, which is the end opposite the receiving end, as clearly shown adjacent the right-hand end of FIGS. 1-3, the side bars 24 of advancing frame 22 are provided with short depending bearing plates 36 which have bearings therein to receive crank pins 38, which are on the outer ends of crank arms 40 which are affixed commonly to the opposite ends of a rotatable crank shaft 42, upon which suitable drive means is connected, such as a sprocket gear 44 around which a sprocket chain 46 extends for engagement with a driving spur 48 on power means comprising, for example, an electric motor 50, which is suitably supported upon one of the legs 14, for example, as best shown in FIGS. 2 and 3. The length of the crank arms 40 is preferably relatively short, commensurate with the length of movement of the left-hand end of the advancing frame 22 with respect to the rollers 26, and the length of the bearing plates 36, for example. However, the throw of the crank arms 40 is sufficient to elevate the side bars 24 of the advancing frame a sufficient distance above the side bars 12 of the base frame 10 as shown, for example, in FIG. 3, to raise all of the bar-like objects 18, for example, and when so raised, advance the same toward the discharge end, such as the right-hand end as shown in the FIGS. 1-3, a limited distance and then upon the descending movement of the crank arms 40, the advanced position of the objects 18 is disposed upon the stationary bars 12 of the base frame 10, while the advancing frame moves to a still lower position and is returned to the left-hand extremity of its movement, as viewed in FIGS. 1-3, so as to dispose increments of the longitudinal areas of the bars 24 beneath different objects 18 for elevation of the same and advancement toward the discharge end of the apparatus by repeating the movement just described, which is effected by the operation of the crank arms 40.

As the bulk of the initially deposited load 16 of the objects 18 is gradually moved toward the discharge end of the apparatus, certain of the leading objects 18 will engage the elevating and dropoff members 52 and 54, which preferably are formed from steel sheets or the like and are triangular in configuration to provide an apex 56 and 58, respectively, thereon. The members 54 move through a somewhat gyratory path which functions to raise and advance the exemplary group or row 60 of objects 18 which climb the ascending edge respectively of the stationary members 52 and movable members 54 in such manner that the uppermost object 18 will pass over the apexes 56 and 58 and drop down the sharper inclined side of the members 52 and 54 for disposition upon the stationary bars 12 of base frame 10, where they will accumulate substantially within a single row, one object high, as shown in exemplary manner, for example, in FIG. 3. The gyratory motion of the portion of the bars 24 of advancing frame 22 nearest the discharge end thereof will progressively advance the row of objects 18 toward the outermost end thereof, and as this is accomplished, additional objects will descend from the apexes 56 and 58 and be received in the inner end of said row in progressive manner.

As the row of objects 18 meets the outer end of the bars 12 of base frame 10, they will engage control means preferably in the form of a pair of pivoted levers 62 which, in idle position, extend angularly in an upward and outward direction for control of switches 64 which are connected by circuitry 66, see FIG. 6, to the current supply, for example, for the electric motor 50, or any other suitable power means, in the event an electric motor is not employed. As can be visualized from FIG. 6, when the leading or outermost object 18 engages the levers 62 of said control means, the switches 64 will be actuated thereby and stop the operation of the motor 50. However, it will be seen that the levers 62 individually control switches 64. Because of this, and in view of the fact that the switches are connected in series to control the operation of motor 50, it is essential that both of the levers 62 shall be depressed simultaneously in order to stop the motor 50. This is beneficial in that in the event one of the objects is dropped onto the outer ends of bars 12 of base frame 10 in a somewhat crooked manner not accurately transverse across said frame, oncoming members will engage the crooked member and straighten the same, in effect, to dispose it accurately in a transverse position so as to simultaneously depress the levers 62 and thereby stop the motor 50.

Discharge of the outermost object 18 from the outer end of the stationary bars 12 of base frame 10 is effected in a positive manner and preferably is controlled manually by an operator, not shown. Discharge is effected by means of flipping the outermost member 18 from the bars 12 as visualized in phantom, for example, in FIG. 7. The flipping apparatus comprises a pair of blades 70 which are commonly fixed to a rotatable shaft 72. Preferably fluid-operated cylinder and piston means 74 are connected to one of the blades 70, as shown in FIG. 7, the fluid-operated means 74 normally maintaining the blades 70 in the full line position thereof, shown in FIG. 7, but when operated such as by actuating a manual valve, not shown, by the aforementioned operator, the piston of the unit is projected and tilts the blades 70 simultaneously so as to smoothly elevate and rotate the object 18 thereon to a position where it falls by gravity down the guides 76, shown in FIGS. 1-3, 6 and 7, for direct passage to the conveyor 68, for example. As soon as the object 18 which has been positioned upon the outer ends of levers 62 of the control apparatus is raised from said levers by the blades 70, the switches 64 controlled by the levers 62 will again be closed and thus, restore operation of the motor 50 for continued advancing movement of the objects 18 along the base frame 10 by means of the advancing frame 22 in the manner described in detail above.

From the foregoing, it will be seen that the present invention provides a relatively simple, rugged and highly durable, as well as efficient, apparatus for unscrambling loads of various kinds of elongated objects disposed transversely upon the apparatus and the apparatus includes details for gradually thinning out the objects into a somewhat orderly and, ultimately, a substantially single row thereof, one object high, and the outermost object is advanced in a manner to effect straightening of the same, if needed, and ultimately positive discharge of the same from the machine onto a receiving conveyor or other apparatus, if desired.

One of the very important features of the present invention comprises means to adjustably limit the advancing movement of the objects, especially from the receiving end of the stationary and advancing frames and extending toward the peaked elevating and dropoff members thereof. Said limiting means comprises a pair of elongated, relatively low, vertical plates 78 which are fixed to the outer sides of the stationary side bars 12 of frame 10, as shown best in FIGS. 1 and 2. The upper edges of said plates are preferably substantially parallel to the side bars 12 and extend only a short distance thereabove for co-operation with a set of adjustable plate-like members 80 which, in the preferred construction, are channel-shaped as seen in cross-section in FIG. 4. The members 80 are of similar length to the stationary vertical plates 78 and are directly supported upon the upper portions of the side bars 24 of the advancing frame 22. The purpose of these adjustable members 80 is to cause the objects 18, especially those in the bulk load 16 thereof adjacent the receiving end of the apparatus, particularly if the nature of the objects or for any other reason where the advancing movement of the objects is desired to be less than that afforded by the throw of the crank arms 40, advancing movement of the adjustable members 80 may be less than that imparted to the side bars 24 by operation of the following adjustable control means which is best illustrated in FIG. 5.

Projecting outward from opposite ends of cross frame member 82 is a fixed detent 84 which is disposed within a space 86, see FIG. 5, which space is adjustable in length as determined by a fixed stop member 88 which projects inward from each of the plate-like members 80 adjacent the end thereof, and the adjustable space-forming means comprising threaded bolts 90, the inner end of which in relation to the stop members 88 defines the length of space 86.

From the foregoing, it will be seen that during the return movement of the side bars 24 to the starting position adjacent the receiving end of the apparatus, especially if less longitudinal movement of the members 80 is desired relative to the side bars 24, the screws 88 are adjusted to abut the detent 84 before the members 24 have been moved to their fully retracted position. Accordingly, when advancing movement is next initiated in accordance with the throw of the crank arms 40, the stop members 88 will be caused to engage the detents 84 before the side bars 24 have moved fully to their ultimate advancing position, whereupon the bars 24 will slide relative to the adjustable members 80 due to the engagement of the stop members 88 with the detents 84, thereby limiting the advancing movement of the objects resting upon the adjustable plate-like members 80 which, during the advancing movement thereof will be raised above the upper edges of the vertical plates 78 and thereby constitute at that particular part of the cycle of movement, the support of objects 18 thereon rather than the vertical plates 78 supporting the same during that particular part of the cycle of movement. It will be understood, of course, that if the full throw of the crank arms 40 is desired to be applied to the advancing movement of the side bars 24, the screws 88 can be retracted to positions wherein such full movement of the bars 24 is permitted while the adjustable members 80 rest upon and move correspondingly therewith.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. An unscrambling apparatus for bar objects, including timber and the like comprising in combination, a stationary base frame comprising elongated longitudinal frame members adapted to receive at one end thereof a plurality of bar-like objects disposed transversely across said frame members and the opposite end comprising the discharge end of said frame, advancing frame means pivotally and slidably supported at one end adjacent said receiving end of said base frame and being at least no higher than said one end of said base frame, power means engaging the opposite end of said advancing frame comprising the discharge end thereof and adapted to successively raise said discharge end of said frame above the level of the discharge end of said stationary base frame and successively lower said discharge end below the level of the discharge end of said base frame while also moving said advancing frame toward the discharge end of said base frame to progressively advance said objects along said base frame toward the discharge end thereof, and means movably supported on said receiving end of said advancing frame means to support said objects and operable to adjustably limit the advancing movement of said objects along said base frame.

2. The apparatus according to claim 1 further characterized by said power means comprising rotary crank means operable to raise and lower said discharge end of said advancing frame as aforesaid and said means to limit said advancing movement adjustably comprising plate-like members extending along said advancing frame from adjacent said receiving end toward the opposite end thereof and movable therewith longitudinally, said limiting means further comprising adjustable space-forming members on said plate-like members engageable at the ends thereof with fixed detent means on said base frame, whereby when the length of the space between said space-forming members is less than the longitudinal movement of said advancing frame, said advancing frame slides beneath said plate-like members in feeding direction without appreciably moving the objects resting upon said plate-like members.

3. The apparatus according to claim 2 in which said space-forming means on said plate-like members comprise a stop member thereon and a longitudinally movable opposing member having an end movable by threads in an opposing direction relative to said stop member to define an adjustable space therebetween in which said fixed detent means is disposed to determine the length of travel of said plate-like members.

4. The apparatus according to claim 1 in which the supporting surfaces of said base frame members and advancing frame means are substantially straight and further including peaked elevating and drop-off members extending upwardly respectively on said base and advancing frames and disposed closer to said discharge end than the receiving end of said frame members and cooperating with each other to level out the objects as advanced from the receiving ends of said frames and cause said objects to be formed substantially into a single level arrangement prior to being advanced to said discharge end of said apparatus.

* * * * *